United States Patent
Berg et al.

(10) Patent No.: US 8,534,984 B2
(45) Date of Patent: Sep. 17, 2013

(54) PRESSWARE STACKING SYSTEM AND METHOD FOR USING SAME

(75) Inventors: Eric J. Berg, Appleton, WI (US); Brandon M. Batz, Myerstown, PA (US); Stephen K. Milligan, Florence, SC (US); Mark B. Littlejohn, Appleton, WI (US)

(73) Assignee: Dixie Consumer Products LLC, Atlanta, GA (US)

(*) Notice: Subject to any disclaimer, the term of this patent is extended or adjusted under 35 U.S.C. 154(b) by 439 days.

(21) Appl. No.: 12/894,240

(22) Filed: Sep. 30, 2010

(65) Prior Publication Data

US 2011/0076127 A1    Mar. 31, 2011

Related U.S. Application Data

(60) Provisional application No. 61/247,458, filed on Sep. 30, 2009.

(51) Int. Cl.
*B65H 31/34*   (2006.01)
*B65G 57/30*   (2006.01)

(52) U.S. Cl.
USPC ................................ 414/789.1; 414/788.2

(58) Field of Classification Search
USPC .............. 198/391, 443, 533, 609, 658, 752.1, 198/774.3; 209/920; 270/58.12; 271/119, 271/125, 210, 221, 222, 224; 366/240; 414/788.2, 788.9, 789, 789.1, 793.8, 794.6
See application file for complete search history.

(56) References Cited

U.S. PATENT DOCUMENTS

| | | | | | |
|---|---|---|---|---|---|
| 703,271 | A | * | 6/1902 | Jelf | 271/210 |
| 1,560,304 | A | * | 11/1925 | Pardee | 241/222 |
| 3,202,263 | A | * | 8/1965 | Stuller et al. | 198/443 |
| 3,418,725 | A | * | 12/1968 | Ruud | 34/506 |
| 3,933,350 | A | * | 1/1976 | Mignano | 271/10.09 |
| 3,957,265 | A | * | 5/1976 | Jelsness-Larsen | 271/213 |
| 4,325,545 | A | * | 4/1982 | Fabrig | 271/221 |
| 4,330,116 | A | * | 5/1982 | Newsome | 271/178 |

* cited by examiner

Primary Examiner — Gregory Adams
(74) Attorney, Agent, or Firm — William W. Letson (57) ABSTRACT

A pressware stacking assembly and method for using the same are provided. The stacking assembly may include a stacking surface for supporting a plurality of pressware products and at least one shaped wheel at least partially disposed through the stacking surface. The shaped wheel may include a body having at least three sides disposed about a perimeter thereof and at least one transition section disposed between adjoining sides, wherein each transition section is adapted to lift at least a portion of the pressware products off the stacking surface.

31 Claims, 3 Drawing Sheets

PRESSWARE STACKING SYSTEM AND METHOD FOR USING SAME

CROSS-REFERENCE TO RELATED APPLICATION

This application is the non-provisional of U.S. Application No. 61/247,458, filed on Sep. 30, 2009, the entirety of which is herein incorporated by reference.

BACKGROUND

1. Field of the Invention

Embodiments of the present disclosure generally relate to pressware stacking systems and methods for using the same.

2. Description of the Related Art

In a typical pressware product stacking system, a take-away table or conveyor transfers pressware products from a matched metal forming die to a stacking can. The products travel down the take-away table and then fall over the edge onto a stacking surface at the bottom of the stacking can or onto a partially completed stack. The system stacks the pressware products on top of each other until each stacking can contains the desired product count. Then the system transfers a completed stack to another conveyor that leads to packaging equipment.

Ideally, all the products in the system fall from the take-away table directly on top of the preceding products and nest perfectly to create a neatly stacked column of pressware products. In previous systems, many factors kept the products from stacking and nesting within each other, effectively leading to the introduction of "bouncers" or "shakers" to agitate the stack. In the past, the "shakers" have been either circular in shape having an eccentric bore or cam lobe shaped. Alternatively, previous systems provided agitation by actuating a small bar located under the pressware product stack with a linkage arm eccentrically mounted to a drive wheel. When used, these devices usually only contact the stack once per revolution. Additionally, some systems used low angled ramps separate from the agitation device to angle the stack during stacking.

While these previous agitation methods and stand alone angled ramp help the stacking process, efficiency has been limited. Efficiency is measured by the stacking system's ability to create a stack of products that do not require human intervention before packaging verses the total number of stacks produced during the same time period. Reasons for inefficient stacking vary. Frequently, products fall from the take-away table into the stacking can at random locations because of random ejection from the forming die. Products also may snag on surfaces and gaps along the system path or on the stack itself, resulting in improper nesting. Sometimes the "shakers" themselves cause stacking disruption, causing some products to bounce from the stack. Inefficient stacking may result in additional product cost from increased scrap from discarded product. Machine shutdowns from product jams caused by stacking can backups also affect press productivity. Additionally, excessive labor costs occur because of additional personnel requirements for machine and stack quality monitoring. Eliminating these issues may have a significant impact on reducing product cost, machine downtime, and labor expense.

SUMMARY

Pressware stacking assemblies and methods for using same are provided. In at least one specific embodiment, a stacking assembly for pressware products includes a stacking surface for supporting a plurality of pressware products and at least one shaped wheel at least partially disposed through the stacking surface. The shaped wheel may include a body having at least three sides disposed about a perimeter thereof and at least one transition section disposed between adjoining sides, wherein each transition section is adapted to lift at least a portion of the pressware products off the stacking surface.

In at least one specific embodiment, a method for stacking pressware includes transferring a plurality of pressware products onto a stacking surface to provide a stack of pressware products thereon and lifting the stack of pressware products using a stacking assembly. The stacking assembly may include at least one shaped wheel at least partially disposed through the stacking surface. The shaped wheel may include a body having at least three sides disposed about a perimeter thereof and at least one transition section disposed between adjoining sides. Each transition section may be adapted to lift at least a portion of the pressware products off the stacking surface.

In at least one other specific embodiment, a stacking assembly for pressware products includes a stacking surface for supporting a plurality of pressware products and at least one shaped wheel at least partially disposed through the stacking surface. The shaped wheel includes a body having at least three sides disposed about a perimeter thereof, wherein each side is adapted to lift at least a portion of the pressware products off the stacking surface.

BRIEF DESCRIPTION OF THE DRAWINGS

So that the recited features may be understood in detail, a more particular description of various exemplary embodiments of the invention, briefly summarized above, may be had by reference to one or more embodiments, some of which are illustrated in the appended drawings. It is to be noted, however, that the appended drawings illustrate only typical embodiments and are therefore not to be considered limiting of its scope, for the invention may admit to other equally effective embodiments. It is emphasized that, in accordance with the standard practice in the industry, various features are not drawn to scale. In fact, the dimensions of the various features may be arbitrarily increased or reduced for clarity of discussion.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

It is also to be understood that the following detailed description describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the detailed description may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Further, the exemplary embodiments presented below may be combined in any combination of ways, i.e., any element from one exemplary embodiment may be used in any other exemplary embodiment, without departing from the scope of the invention.

Figure 1:
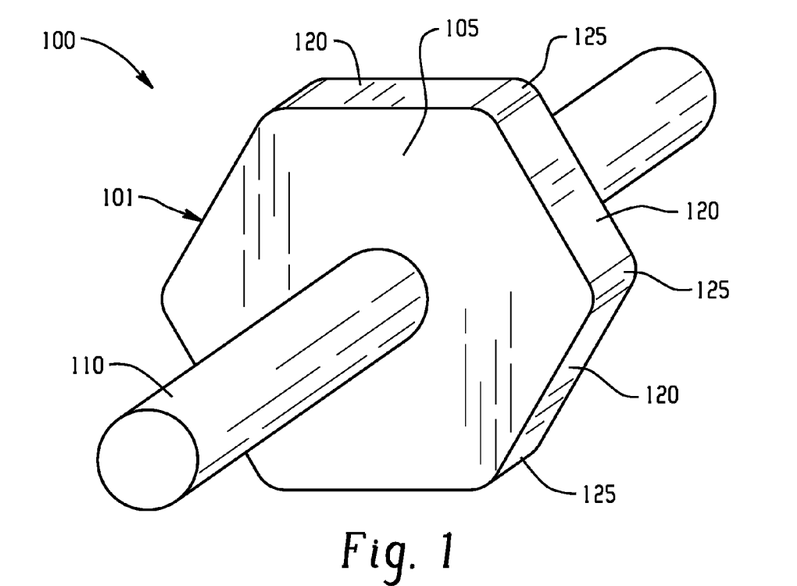
FIG. 1 depicts an isometric view of an illustrative wheel assembly, according to one or more embodiments described.

FIG. 1 depicts an isometric view of an illustrative wheel assembly 100, according to one or more embodiments. The wheel assembly 100 may include a shaped wheel 101 and shaft 110. The shaped wheel 101 includes a body 105 having at least three sides 120 disposed or located about a perimeter thereof. Each side 120 may be flat or substantially flat, as depicted in FIG. 1. Alternatively, each side 120 may be angled, curved, beveled, or have any other profile or shape.

Although six (6) sides 120 are shown, the shaped wheel 101 may have at least three sides, up to about 20 sides, or 3 to 15. In one or more embodiments, the shaped wheel 101 may have three, four, five, six, seven, eight, nine, ten, eleven, twelve, thirteen, fourteen, or fifteen sides 120. As will be explained in more detail below, the desirable number of sides 120 may be determined based on the size of the shaped wheel 101, the rotation speed of the shaft 110, and/or the type of pressware product being stacked.

Figure 2:
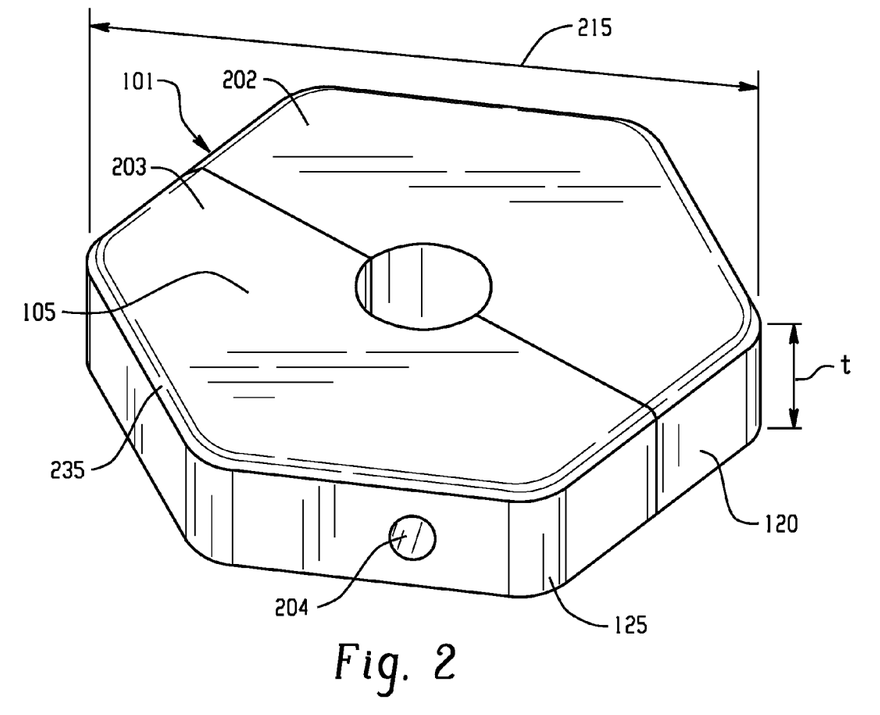
FIG. 2 depicts an isometric view of the wheel depicted in FIG. 1, according to one or more embodiments described.

FIG. 2 depicts an isometric view of the shaped wheel 101 depicted in FIG. 1, according to one or more embodiments. The shaped wheel 101 may be a monolithic structure or manufactured from two or more pieces or components. For example, the shaped wheel 101 may be made from two or more portions or sections (two are shown 202, 203) that are fastened, adhered, or otherwise fixed together, as depicted in FIG. 2. Each section 202, 203 may have the same size or may be disproportionate relative to one another. For example, the first section 202 may be of from 30% to 70% of the surface area of the wheel 101, and the second section 203 may be the other 70% to 30%. An even 50/50 split may be used. Apportioning the shaped wheel 101 into two or more sections 202, 203 allows for easy attachment to the shaft 110 and may allow for quick changeover when necessary.

The sections 202, 203 may be joined or otherwise fixed together using one or more standard fasteners (not shown). A suitable fastener may be a standard cap screw. Other suitable fasteners may include socket head cap screws recessed into at least one section 202, 203 with a clearance hole in one section and tapped into the other section directly or with a threaded insert. The sides 120 may include one or more holes, bores, or openings 204 to facilitate the use of the fasteners. The clamp force between the sections 202 and 203 should be sufficient to secure the shaped wheel 101 to the shaft 110. Sections 202 and 203 may be sized to have slight gap at their junction and to grip the shaft 110 with the fastener.

Still referring to FIG. 2, each side 120 has an outer perimeter or edge 235. Although the edges 235 are depicted as being rounded, the edges may be squared, beveled, chamfered, rippled, or angular. Each edge 235 may be the same or different. For example, the edges 235 of the sides 120 in the first portion 202 of the wheel 101 may be rounded, and the edges 235 of the sides 120 in the second portion 203 of the wheel 101 may be squared, beveled, chamfered, rippled, or angular. In one or more embodiments, the edges 235 of adjoining or adjacent sides 120 may alternate between rounded and squared. The edges 235 may have any frequency or pattern of two or more rounded, squared, beveled, chamfered, rippled, or angular profiles. As will be explained in more detail below, the perimeter edge 235 may help with wear characteristics of the shaped wheel 101 when in use.

The length of each side 120 may range from a low of about 0.25 inches, about 1 inch, about 2.5 inches, or about 4 inches to a high of about 5 inches, about 6 inches, about 8 inches, or about 10 inches. For example, the length of each side 120 may range from about 3 inches to about 7 inches, about 2 inches to about 5.5 inches, or about 3.5 inches to about 9 inches.

In one or more embodiments, the length any two adjacent or adjoining sides 120 may be the same or different. For example, a first side 120 may have a length of about 2.75 inches and an adjoining or adjacent second side 120 may have a length of about 5.75 inches. In another example, a first side 120 and an adjoining or adjacent second side 120 may both have a length of about 5 inches. As such, the length of the sides 120 may be constant or vary about a perimeter of the wheel 101.

Referring again to FIG. 2, the thickness (t), of the shaped wheel 101 may be the same as the thickness or width of each side 120. The thickness or width of each side 120 may range from a low of about 0.05 inches, about 0.125 inches, about 0.25 inches, about 0.75 inches or about 1.5 inches to a high of about 2 inches, about 3 inches, about 4 inches, or about 5 inches. For example, the width of each side 120 may range from about 0.325 inches to about 2.5 inches, about 1.25 inches to about 3.5 inches, or about 0.5 inches to about 4.5 inches.

Figure 3:
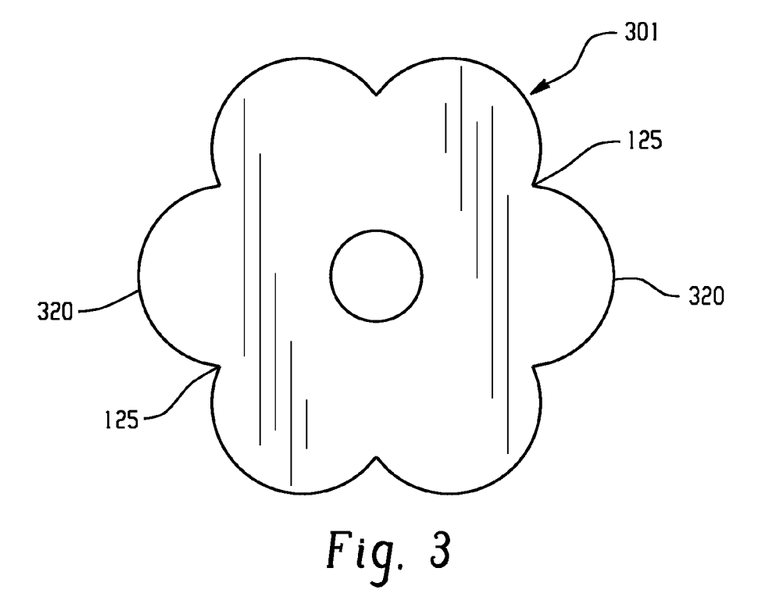
FIG. 3 depicts a schematic side view of another illustrative shaped wheel, according to one or more embodiments described.
Figure 4:
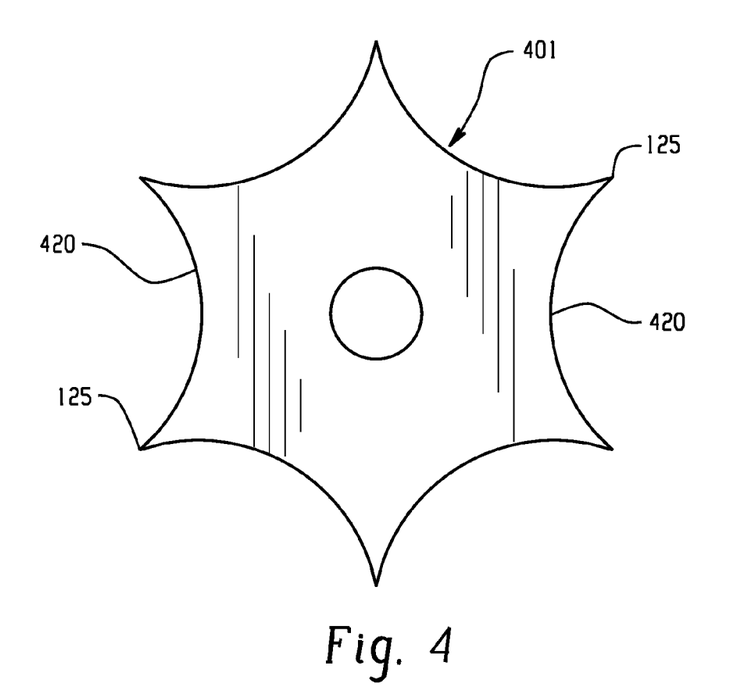
FIG. 4 depicts a schematic side view of yet another illustrative shaped wheel, according to one or more embodiments described.

FIG. 3 depicts a schematic side view of another illustrative shaped wheel 301 having outwardly curved or convex sides 320. FIG. 4 depicts a schematic side view of yet another illustrative shaped wheel 401 having inwardly curved or concave sides 420. In another example (not shown), each side may be angled. In a further example each side may be beveled. In yet another example each side may have sinusoidal ripples in the direction of the width of the side. In one or more embodiment, adjacent or adjoining sides 120, 320, or 420 may have different features for the same shaped wheel 101. For example, a first side 120 may be flat and a second side 120 may be angled. In another example, the first side 120 may be curved out, the second side 120 may be curved in, and a third side 120 may be angled. In yet another example, the first side 120 may be beveled, the second side 120 may have sinusoidal ridges, and the third side 120 may be chamfered.

The shaped wheel 101 may further include at least one transition section 125 disposed between adjoining sides 120. The shaped wheels 301 and 401 also may include at least one transition section 125 disposed between adjoining sides 320 and 420, respectively. Each transition section 125 may be the same or different, and may be flat, rounded, beveled, chamfered, rippled, angular, or any combination thereof. In one or more embodiment, transition sections 125 may have different features for the same shaped wheel 101. For example, a first transition section 125 may be flat and a transition section 125 may be angled. In another example, the first transition section 125 may be curved outwardly, the second transition section 125 may be curved in, and a third transition section 125 may be angled. In yet another example, a first side 125 may be beveled, a second side 125 may have sinusoidal ridges, and a third side 125 may be chamfered. As will be explained in more detail below, the transition section 125 may affect the amplitude of the shaped wheel 101 without affecting the frequency of vibration.

A diameter or cross-section length 215 of the shaped wheel 101 may range from a low of about 1 inch, about 2 inches, about 3 inches, about 4 inches to a high of about 6 inches, about 9 inches, about 12 inches, about 15 inches, or about 20 inches. For example, the cross-section length 215 may range from about 1.5 inches to about 7 inches, about 2.5 inches to about 10 inches, about 3.5 inches to about 13 inches, or about 4 inches to about 18 inches. Such diameter or cross-section length is represented by the line segment 215 that passes through the center of the shaped wheel 101 and has endpoints on the perimeter of the shaped wheel 101. In one or more embodiments, the cross-section length 215 may be about 3.5 inches to about 6 inches. In another example, the cross-section length 215 may be about 4 inches.

The shaped wheel 101 and shaft 110 may be made from any suitable material. Such suitable materials include but are not limited to any one or more metals (such as aluminum, steel, stainless steel, brass, nickel), fiberglass, wood, composite materials (such as ceramics, wood/polymer blends, cloth/polymer blends, etc.), and plastics (such as polyethylene, polyethylene (UHMW), polypropylene, polystyrene, polyurethane, polyethylethylketone (PEEK), polytetrafluoroethylene (PTFE), polyamide resins (such as nylon 6 (N6), nylon 66 (N66)), polyester resins (such as polybutylene terephthalate (PBT), polyethylene terephthalate (PET), polyethylene isophthalate (PEI), PET/PEI copolymer) polynitrile resins (such as polyacrylonitrile (PAN), polymethacrylonitrile, acrylonitrile-styrene copolymers (AS), methacrylonitrile-styrene copolymers, methacrylonitrile-styrene-butadiene copolymers; and acrylonitrile-butadiene-styrene (ABS)), polymethacrylate resins (such as polymethyl methacrylate and polyethylacrylate), cellulose resins (such as cellulose acetate and cellulose acetate butyrate); polyimide resins (such as aromatic polyimides), polycarbonates (PC), elastomers (such as ethylene-propylene rubber (EPR), ethylene propylene-diene monomer rubber (EPDM), styrenic block copolymers (SBC), polyisobutylene (PIB), butyl rubber, neoprene rubber, halobutyl rubber and the like), as well as mixtures, blends, and copolymers of any and all of the foregoing materials.

Figure 5:
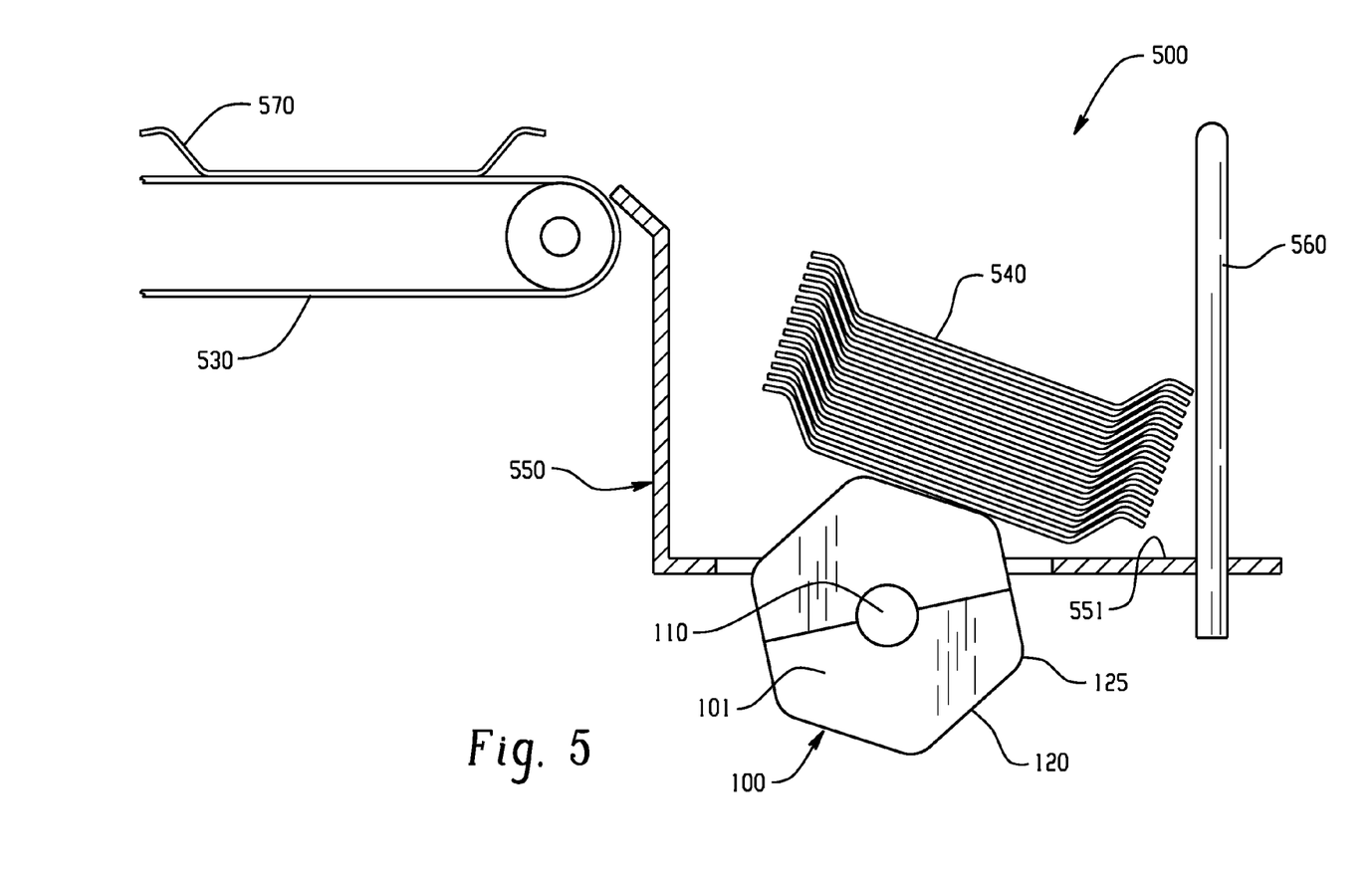
FIG. 5 depicts an illustrative schematic of a pressware stacking system, according to one or more embodiments described.

FIG. 5 depicts an illustrative schematic of a pressware stacking system 500, according to one or more embodiments. The pressware stacking system 500 may have a take-away table 530 for conveying at least one pressware product 570. Pressware products 570 may include, but are not limited to bowls, plates, containers, trays, platters, deep dishes, and fluted products. The take-away table 530 may be any apparatus that conveys or transports physical objects from one location to another. For example, the take-away table 530 may be any device that transports one pressware product 570 from a first location to a second location. The take-away table 530 may be a conveyor using at least one belt. The take-away table 530 may be a conveyor belt, a chain, a robotic arm, a pulley system, and/or a system of moving pressware products 570. The take away table 530 may have multiple lanes separated by dividers to convey or transport pressware products 570.

The pressware stacking system 500 may also include a stacking assembly. The stacking assembly may include a stacking area or recess 550. The stacking recess 550 provides a surface 551 for supporting a plurality of pressware products. The take-away table 530 may convey, feed, or transfer each pressware product 570 onto the stacking recess 550 to form a stack of pressware product 540 thereon.

The stacking area 550 may be any recessed surface adjacent and beneath the take-away table 530. The stacking surface 551 may be recessed from the take-away table 530 at least a depth greater than or equal to the completed stack 540. The completed stack 540 may have a count of about 25 to 125 pressware products 570, or 25 to 100; or 30 to 90; or 40 to 75; or 25 to 75. At least one retractable pin 560 and/or a guide wall or divider (not shown) may be used to help position the pressware products 570 on top of the stack 540 during stacking on the stacking surface 551.

A second conveyor (not shown) may be located adjacent to the stacking recess 550. The second conveyor may transport the pressware stack 540 away from the take-away table 530 and/or stacking recess 550. Pressware products 570 may be conveyed on the second conveyor to a packaging location or further point in an assembly line.

The completed stack 540 may be released and removed from the stacking recess 550 at the lowering of the retractable stop pin 560 and may be advanced onto the second conveyor by a mechanically, pneumatically, and/or electronically actuated arm, lever, and/or post. In one embodiment, the second conveyer may move the pressware stack 540 in a direction substantially perpendicular to the direction of the take-away table 530. In another embodiment, the second conveyer may move pressware stack 540 in a substantially similar direction to the direction of the take-away table 530.

In the stacking assembly for pressware products, at least one wheel assembly 100 may be eccentrically positioned proximate the stacking surface 551 such that the at least one shaped wheel 101 of the wheel assembly 100 contacts the stack 540 at a position off-center from a vertical axis passing through the center of stack 540. The pressware stacking system 500 including the stacking assembly may have a plurality of shaped wheels 101. In one embodiment, the pressware stacking system 500 has a number of shaped wheels 101 corresponding to the number of lanes of the take-away table 530. In another embodiment, the pressware stacking system 500 has twice the number of shaped wheels 101 as the number of lanes of the take-away table 530.

The shaped wheel 101 may be rotatably mounted about a central axis, wherein the central axis passes through a shaft 110. The shaft 110 and the majority of the at least one shaped wheel 101 may be positioned below the stacking surface 551. In another embodiment, the shaft 110 and the shaped wheel 101 may be positioned above the stacking surface 551. The shaped wheel 101 may be at least partially disposed through the stacking surface 551. At least a portion of the shaped wheel 101 may protrude through an opening in the stacking recess 550 or an opening in the stacking surface 551. In one configuration, a portion of the shaped wheel 101 may protrude through the stacking surface 551 to engage the bottom of the stack 540.

The bottom of the stack 540 may rest at an angle in the stacking recess 550 with respect to the substantially horizontal stacking surface 551. The size, location, and protrusion of the shaped wheel 101, possibly disposed through the stacking surface, determine the angle between the stacking surface 551 and the stack 540 and the angle between the stack 540 and the horizontal. The stacking surface 551 may be horizontal, but also may be any other angle from the horizontal. Different pressware products 570 may use different angles to obtain optimum stacking The optimum stacking angle may vary from a low of about 2.5 degrees, 5 degrees, and 7.5 degrees to about 10 degrees, 12 degrees, 20 degrees, 25 degrees, 40 degrees, or 45 degrees from the horizontal. For example, the optimum stacking angle may range from 10 degrees to 30 degrees, about 3 degrees to about 35 degrees, or about 5 degrees to about 33 degrees from the horizontal. In another example, the stacking angle may be about 15 degrees.

The at least one transition section 125 may be adapted to lift at least a portion of the pressware products 570 off the stacking surface. In another embodiment, at least one of the transition sections 125 and the sides 120 may be adapted to lift at least a portion of the pressware products 570 off the stacking surface. The at least one transition section 125 may be adapted to lift the pressware products to an angle of about 5 degrees to about 30 degrees from the horizontal. The shape of the transition sections 125 and the sides 120 may affect the degree of agitation and characteristics of vibrations of the stack 540. The transition section 125 may also help a first side 120 transition to an adjoining or adjacent side 120 during rotation, thereby relieving the impact on the stack 540. For example, a rounded transition section 125 may allow for a more regular, less drastic changes in amplitude as the rate of vibration increases.

The shaped wheel 101 may be placed between the center of the stack 540 and the end of the take-away table 530, i.e. behind the center of the stack 540, to cause the stack 540 to tip towards the second conveyor and away from the take-away table 530. As described above, eccentrically locating the shaped wheel places the stack 540 at an angle. For example, the stack 540 may be angled away from a take-away table 570 and angled towards a second conveyer. In another example, a stack 540 may be angled toward one side of the stacking surface 551. In another example, the shaped wheel 101 causes the stack 540 to tip towards the at least one retractable pin 560. The retractable pin 560 may be vertical or angled away from the take-away table 530 to aid in formation of the stack 540. In one embodiment, the angle of the retractable pin 560 may vary from a low of about 2 degrees, 5 degrees, and 7.5 degrees to about 10 degrees, 12 degrees, 15 degrees, 25 degrees, 30 degrees, or 45 degrees from vertical. For example, the angle of the retractable pin 560 may range from 2.5 degrees to 20 degrees, about 3 degrees to about 18 degrees, or about 5 degrees to about 40 degrees from vertical. In another example, the angle of the retractable pin 560 may be about 15 degrees from vertical.

Referring again to FIG. 5, the pressware products 570 may be formed in a pressware die. The pressware product 570 may be formed or configured in the die into a shape that allows the pressware product 570 to nest or closely fit on top of another pressware product 570 when stacked. Once formed, the pressware products 570 may be conveyed one at a time along the take-away table 530 towards the stacking recess 550. Multiple pressware products 570 may also be conveyed simultaneously along the take-away table 530 in multiple lanes. Because the take-away table 530 may have a height higher than the stacking recess 550, the pressware products 570 then may be conveyed along the take-away table 530 and dropped into the stacking recess 550. In another embodiment, pressware products 570 may be transferred from multiple lanes on the take-away table 530 to multiple stacking recesses 550. In yet another embodiment, a take-away table 530 may not be used to transfer pressware products 570. As the pressware products 570 drop or arrive into the stacking recess 550, they may form the stack 540. The stack may be formed by the nesting of a plurality of pressware products 570 one on top of another.

As the stack 540 is formed, the shaped wheel 101 may be rotated about a central axis so the sides 120 sequentially contact the bottom of the stack 540. The shaped wheel 101 may also be rotated so at least one of its transition sections 125 may sequentially contact the bottom of the stack 540. In at least one embodiment, the shaped wheel 101 may also be rotated so that at least one of the transition sections 125 and one of the sides 120 sequentially contact the bottom of the stack 540. Accordingly, any one or more of the sides 120 and/or any one or more of the transition sections 125 can be a "contact surface" for vibrating or otherwise agitating the pressware in the stack 540.

The rotational contact of the side 120 and transition section 125 may cause the stack 540 to vibrate. The vibration may cause a constant agitation of the stack 540, a controlled agitation of the stack 540, or an intermittent agitation of the stack 540. Depending on the number of sides 120, the wheel assembly 100 may provide from about 3, 4, 5 or 6 to up to about 7, 8, 9, 10, 11, 12, 13, 14, 15, 30, or 45 "hits" per revolution of the shaped wheel 101, wherein a "hit" occurs when one side 120 or transition section 125 contacts the bottom of the stack 540. For example, the wheel assembly 100 may provide four to ten hits per revolution of the shaped wheel 101, thus contacting the bottom of the stack 540 four to ten times per revolution. The wheel assembly 100 may provide from about 3, 4, 5, or 6 up to about 30, 35, 40, 45, 50, 55, 60, 65, 70, 75, 80, 85, 90, 95, or 100 hits per pressware product 570 before another pressware product 570 falls to the stack 540. For example, the wheel assembly 100 may provide about four to about a hundred hits per pressware product 570 before another pressware product 570 falls to the stack 540. In another example, the wheel assembly 100 may provide about thirty hits per pressware product 570 before another pressware product 570 falls to the stack 540.

Each hit slightly raises the stack 540, marginally increasing the angle between the stacking surface 551 and the bottom of the stack 540, and thus agitating the entire stack 540. The hit may impart enough force to motivate the pressware product 570 into the stack 540 due to high acceleration forces in the region of the side 120, transition section 125, or combination of both, yet subtle enough that they do not impart enough force to throw pressware products 570 from the stack 540 or keep the stack 540 from becoming too violent when high stack counts are encountered. The speed of rotation may affect whether a side 120, a transition section 125, or both contacts the stack 540. A slowly rotating shaped wheel 101 may contact a stack 540 with both a side 120 and a transition section 125, whereas a rapidly rotating shaped wheel may only contact a stack 540 with at least one transition section 125 or at least one side 120.

The degree of agitation depends on the number of sides 120 and the rate of rotation of wheel assembly 100. The number of sides 120 effect amplitude and frequency of vibration. The amplitude of vibration describes the displacement of the stack 540 and the frequency of vibration describes the rate of displacement of the stack 540. Speed of the shaft 110 also may control the frequency of vibration. The frequency may be tuned for optimum performance. Ideally, vibration may allow a pressware product 570 to "float" atop the stack 540 until it settles into the stack 540 and nests properly. The vibration may create a symmetrical wave-like motion of the stack 540. The wheel assembly 100 may add vibration to the process without adding additional fatigue on components or noise to an operating facility.

The shaped wheel 101 may provide both agitation and an angle to the stack 540 of pressware products 570 for improved stacking efficiency. The shaped wheel 101 may rotate in an off-center location below the stacking recess 550 and/or partially protruding through the stacking surface 551. The shaped wheel 101 may protrude through an opening in the stacking surface 551 and may then lift at least one end of a stack 540. Then as the shaped wheel 101 rotates, it may agitate the stack 540 while placing the stack 540 at an angle with respect to the stacking surface 551 or the horizontal. The angle may range from about 5 degrees to about 10, 15, 20, 25, or 30 degrees from the horizontal. The angle may be between the stack 540 and the stacking surface 551 and may be the same as the angle between the stack 540 and the horizontal. In another embodiment, the angles may be different. This combination of vibration and angle provided by the stacking assembly efficiently results in properly stacked pressware products 570 in a completed stack 540.

The angle used on the pusher can cause the stacks to tip when pushed, to obtain an angle sufficient enough to impact the stacking efficiency. Since the wheel of the present invention provides the angle as well, it eliminates any sort of ramp that's attached to the pusher. Since the pusher does not contain the angle, the stack is pushed with a vertical surface so the stack will not have the same tendency to tip. With the vibration wheels, often the stack is pushed from the stacking can when the pins are retracted from the motion of the wheel itself, eliminating the need for a pusher altogether.

The vibration the wheels create is superior to current practice for several reasons as well. The vibration created by the wheels fits the middle ground not attainable by using the traditional shakers. The angle component of the wheel guides the plate to the stack, while the vibration helps the plate settle and nest into the stack. This vibration is subtle enough to keep products from bouncing uncontrollably in the stacking can when only a few products are present, yet enough agitation to motivate the products into the stack and successfully nest during system upsets.

The vibration wheels are able to add vibration to the process without adding additional fatigue on components or noise to the operating facility. They are a relatively simple design that makes them easy to manufacture, replace and maintain. They provide a low cost modification that can easily be added to all existing equipment.

Another advantage to the vibration wheels is the potential savings from increased stacking efficiency providing more reliable performance thus reducing the need for personnel stack intervention. Essentially less manpower is required to maintain quality stacks with the use of vibration wheels saving labor costs and improving efficiency.

Embodiments further relate to any one or more of the following paragraphs:

1. A stacking assembly for pressware products, comprising: a stacking surface for supporting a plurality of pressware products; and at least one shaped wheel at least partially disposed through the stacking surface, the shaped wheel comprising: a body having at least three sides disposed about a perimeter thereof; and at least one transition section disposed between adjoining sides, wherein at least a portion of the shaped wheel is adapted to lift at least a portion of the pressware products off the stacking surface.

2. The stacking assembly according to paragraph 1, wherein the transition section is adapted to lift the pressware products off the stacking surface at an angle of about 5 degrees to about 30 degrees from the horizontal.

3. The stacking assembly according to paragraphs 1 or 2, wherein each transition section is rounded.

4. The stacking assembly according to any of paragraphs 1 to 3, wherein each transition section has a rounded perimeter edge.

5. The stacking assembly according to any of paragraphs 1 to 4, wherein each side has a rounded perimeter edge.

6. The stacking assembly according to any of paragraphs 1 to 5, wherein at least one of the sides is substantially flat.

7. The stacking assembly according to any of paragraphs 1 to 6, wherein at least one of the sides is concave.

8. The stacking assembly according to any of paragraphs 1 to 7, wherein at least one of the sides is convex.

9. The stacking assembly according to any of paragraphs 1 to 8, wherein the shaped wheel has at least six sides and six transition sections.

10. The stacking assembly according to any of paragraphs 1 to 9, wherein the shaped wheel has at least twelve sides and twelve transition sections.

11. The stacking assembly according to any of paragraphs 1 to 10, wherein the shaped wheel is disposed about a rotatable shaft disposed through the body.

12. The stacking assembly according to any of paragraphs 1 to 11, wherein the shaped wheel comprises at least two sections secured together.

13. The stacking assembly according to any of paragraphs 1 to 12, wherein the shaped wheel has a cross-sectional length of about 3.5 inches to about 6 inches.

14. The stacking assembly according to any of paragraphs 1 to 13, wherein the shaped wheel has a cross-sectional length of at least 4 inches.

15. A method for stacking pressware, comprising: transferring a plurality of pressware products onto a stacking surface to provide a stack of pressware products thereon; and lifting the stack of pressware products using a stacking assembly, the stacking assembly comprising: at least one shaped wheel at least partially disposed through the stacking surface, the shaped wheel comprising: a body having at least three sides disposed about a perimeter thereof; and at least one transition section disposed between adjoining sides, wherein at least a portion of the shaped wheel is adapted to lift at least a portion of the pressware products off the stacking surface.

16. The method according to paragraph 15, wherein the shaped wheel has at least six sides and six transition sections.

17. The method according to paragraphs 15 or 16, wherein lifting the stack of pressware products comprises rotating the shaped wheel thereby contacting at least a portion of the stack and lifting the contacted portion of the stack from the stacking surface about 5 degrees to about 30 degrees from the horizontal.

18. The method according to any of paragraphs 15 to 17, wherein the transition section of the wheel lifts the stack about four to ten times per revolution of the wheel.

19. The method according to any of paragraphs 15 to 18, wherein the stack is lifted about four to a hundred times between each pressware product.

20. The method according to any of paragraphs 15 to 19, wherein repetitive lifting of the stack vibrates the stack to provide more uniform nesting of the products.

21. A stacking assembly for pressware products, comprising: a stacking surface for supporting a plurality of pressware products; and at least one shaped wheel at least partially disposed through the stacking surface, the shaped wheel comprising: a body having at least three sides disposed about a perimeter thereof, wherein each side is adapted to lift at least a portion of the pressware products off the stacking surface.

22. The stacking assembly according to paragraph 21, wherein at least one side is adapted to lift the pressware products off the stacking surface at an angle of about 5 degrees to about 30 degrees from the horizontal.

23. The stacking assembly according to paragraphs 21 or 22, wherein each side is rounded.

24. The stacking assembly according to any of paragraphs 21 to 23, wherein each side has a rounded perimeter edge.

25. The stacking assembly according to any of paragraphs 21 to 24, wherein at least one of the sides is substantially flat.

26. The stacking assembly according to any of paragraphs 21 to 25, wherein at least one of the sides is concave.

27. The stacking assembly according to any of paragraphs 21 to 26, wherein at least one of the sides is convex.

28. The stacking assembly according to any of paragraphs 21 to 27, wherein the shaped wheel has at least six sides.

29. The stacking assembly according to any of paragraphs 21 to 28, wherein the shaped wheel has at least twelve sides.

30. The stacking assembly according to any of paragraphs 21 to 29, wherein the shaped wheel is disposed about a rotatable shaft disposed through the body.

31. The stacking assembly according to any of paragraphs 21 to 30, wherein the shaped wheel comprises at least two sections secured together.

32. The stacking assembly according to any of paragraphs 21 to 31, wherein the shaped wheel has a cross-sectional length of about 3.5 inches to about 6 inches.

33. The stacking assembly according to any of paragraphs 21 to 32, wherein the shaped wheel has a cross-sectional length of at least 4 inches.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow. In the foregoing discussion and in the claims, the terms "including" and "comprising" are used in an open-ended fashion, and thus should be interpreted to mean "including, but not limited to."

What is claimed is:

1. A stacking assembly for presshare products, comprising:
    a stacking surface for supporting a plurality of presshare products;
    a conveyor for conveying the presshare products to the stacking surface;
    a retractable stop disposed proximate the stacking surface; and
    at least one shaped wheel at least partially disposed through the stacking surface, the shaped wheel comprising:
        a body having at least three sides disposed about a perimeter thereof; and
        at least one transition section disposed between adjoining sides, wherein at least a portion of the shaped wheel is adapted to lift at least a portion of the presshare products off the stacking surface and tip the presshare products toward the retractable stop, wherein the shaped wheel lifts and tips the presshare products in the conveying direction.

2. The stacking assembly of claim 1, wherein the transition section is adapted to lift the presshare products off the stacking surface at an angle of about 5 degrees to about 30 degrees from the horizontal.

3. The stacking assembly of claim 1, wherein each transition section is rounded.

4. The stacking assembly of claim 1, wherein each transition section has a rounded perimeter edge.

5. The stacking assembly of claim 1, wherein each side has a rounded perimeter edge.

6. The stacking assembly of claim 1, wherein at least one of the sides is substantially flat.

7. The stacking assembly of claim 1, wherein at least one of the sides is concave.

8. The stacking assembly of claim 1, wherein at least one of the sides is convex.

9. The stacking assembly of claim 1, wherein the shaped wheel has at least six sides and six transition sections.

10. The stacking assembly of claim 1, wherein the shaped wheel is disposed about a rotatable shaft disposed through the body.

11. The stacking assembly of claim 1, wherein the shaped wheel comprises at least two sections secured together.

12. The stacking assembly of claim 1, wherein the shaped wheel has a cross-sectional length of about 3.5 inches to about 6 inches.

13. The stacking assembly of claim 1, wherein the shaped wheel has a cross-sectional length of at least 4 inches.

14. A method for stacking presshare, comprising:
    conveying a plurality of presshare products onto a stacking surface to provide a stack of presshare products thereon; and
    lifting and tipping the stack of presshare products using a stacking assembly, the stacking assembly comprising:
        a retractable stop disposed proximate the stacking surface; and
        at least one shaped wheel at least partially disposed through the stacking surface, the shaped wheel comprising:
            a body having at least three sides disposed about a perimeter thereof; and
            at least one transition section disposed between adjoining sides, wherein at least a portion of the shaped wheel is adapted to lift at least a portion of the presshare products off the stacking surface and tip the presshare products toward the retractable stop, wherein the shaped wheel lifts and tips the presshare products in the conveying direction.

15. The method of claim 14, wherein the shaped wheel has at least six sides and six transition sections.

16. The method of claim 14, wherein lifting the stack of presshare products comprises rotating the shaped wheel thereby contacting at least a portion of the stack and lifting the contacted portion of the stack from the stacking surface about 5 degrees to about 30 degrees from the horizontal.

17. The method of claim 14, wherein the transition section of the wheel lifts the stack about four to ten times per revolution of the wheel.

18. The method of claim 14, wherein the stack is lifted about four to a hundred times between each presshare product.

19. The method of claim 14, wherein repetitive lifting of the stack vibrates the stack to provide more uniform nesting of the products.

20. A stacking assembly for pressware products, comprising:
- a stacking surface for supporting a plurality of pressware products;
- a conveyor for conveying the pressware products to the stacking surface;
- a retractable stop disposed proximate the stacking surface; and
- at least one shaped wheel at least partially disposed through the stacking surface, the shaped wheel comprising:
  - a body having at least three sides disposed about a perimeter thereof, wherein each side is adapted to lift at least a portion of the pressware products off the stacking surface and tip the pressware products toward the retractable stop, wherein the shaped wheel lifts and tips the pressware products in the conveying direction.

21. The stacking assembly of claim 20, wherein at least one side is adapted to lift the pressware products off the stacking surface at an angle of about 5 degrees to about 30 degrees from the horizontal.

22. The stacking assembly of claim 20, wherein each side is rounded.

23. The stacking assembly of claim 20, wherein each side has a rounded perimeter edge.

24. The stacking assembly of claim 20, wherein at least one of the sides is substantially flat.

25. The stacking assembly of claim 20, wherein at least one of the sides is concave.

26. The stacking assembly of claim 20, wherein at least one of the sides is convex.

27. The stacking assembly of claim 20, wherein the shaped wheel has at least six sides.

28. The stacking assembly of claim 20, wherein the shaped wheel has a cross-sectional length of about 3.5 inches to about 6 inches.

29. The stacking assembly of claim 20, wherein the shaped wheel has a cross-sectional length of at least 4 inches.

30. The stacking assembly of claim 1, wherein the body of the shaped wheel is a single piece or two pieces joined together.

31. The stacking assembly of claim 20, wherein the body of the shaped wheel is a single piece or two pieces joined together.

* * * * *